United States Patent
Yarlott

[15] 3,645,173
[45] Feb. 29, 1972

[54] FLUID ACTUATOR

[72] Inventor: John M. Yarlott, Harvard, Mass.

[73] Assignee: Trish Energetics, Inc., Harvard, Mass.

[22] Filed: Oct. 20, 1969

[21] Appl. No.: 867,463

[52] U.S. Cl. ...................................92/92, 92/47
[51] Int. Cl. ..........................................F01b 19/00
[58] Field of Search ..............251/12, 61; 92/42, 92, 47, 92/34, 89; 46/87; 150/1

[56] References Cited

UNITED STATES PATENTS 2,865,419  12/1958  Cunningham..............................150/1
2,789,580  4/1957  Woods........................................92/47

FOREIGN PATENTS OR APPLICATIONS 674,031  6/1952  Great Britain..........................251/61

Primary Examiner—Martin P. Schwadron
Assistant Examiner—R. H. Lazarus
Attorney—McCormick, Paulding & Huber

[57] ABSTRACT

A fluid actuator comprising an axially elongated flexible thin-walled shell defining a fluid chamber and having coupling members projecting axially outwardly from opposite ends thereof for attachment to other elements in a system to be actuated. The shell is adapted for radial expansion and contraction in response to variation of fluid pressure in the chamber to move the coupling members between axially retracted and extended positions and has a generally prolate spheroidal form in its radially expanded condition. A network of substantially nonelastic or inextensible strands embedded in the elastomeric material from which the shell is made prevents elastic expansion of the shell wall within the range of normal fluid operating pressure.

15 Claims, 8 Drawing Figures

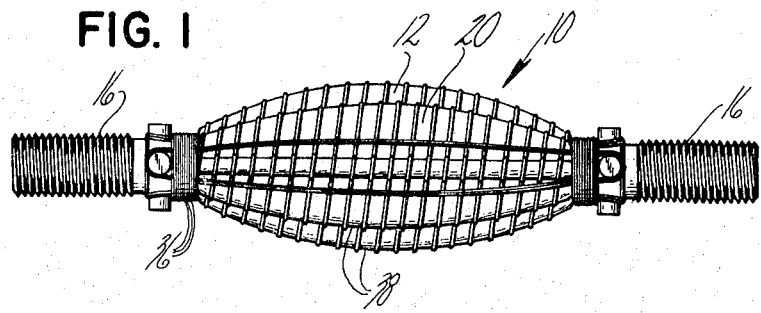
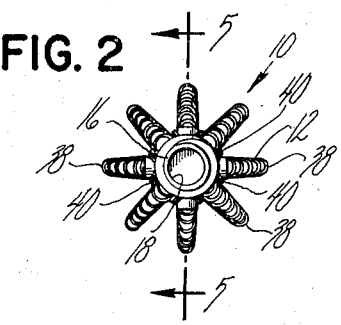
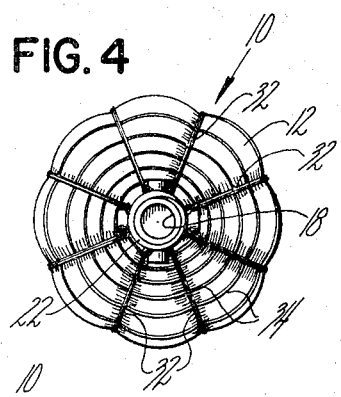
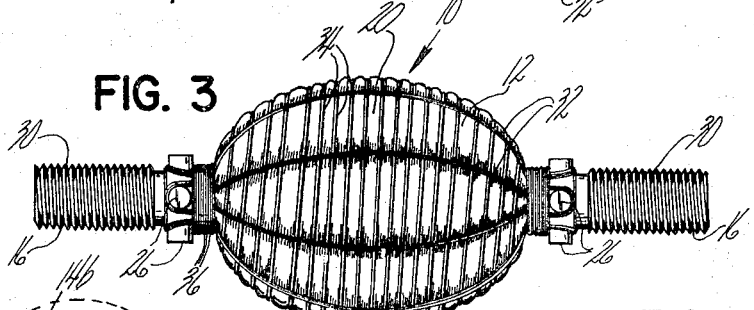
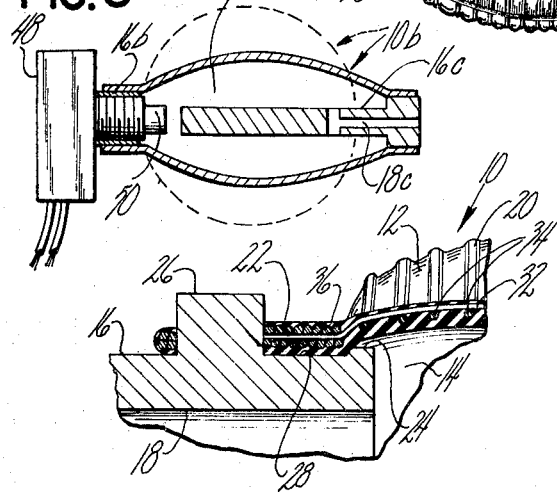
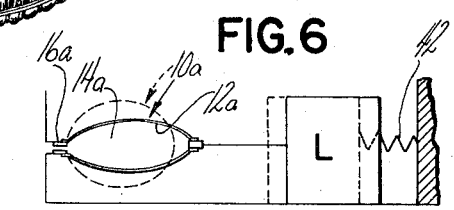
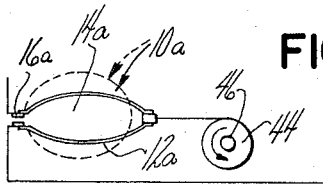
INVENTOR.
JOHN M. YARLOTT
BY McCormick, Paulding & Huber
ATTORNEYS

FLUID ACTUATOR

BACKGROUND OF THE INVENTION

This invention relates in general to fluid actuators or transducers and deals more particularly with a device for converting fluid energy input to mechanical output.

The general aim of the present invention is to provide a device of the aforedescribed character particularly adapted for response to relatively low fluid input pressure. A more particular object of the invention is to provide an efficient force-displacement transformer capable of high-frequency operation in response to relatively slight fluid pressure variation. A further aim of the invention is to provide a fluid actuator for accelerating a load in response to a relatively low fluid input pressure.

SUMMARY OF THE INVENTION

In accordance with the present invention a fluid actuator is provided which comprises an axially elongated flexible thin walled shell defining a fluid pressure chamber and having axially opposed coupling members connected to the opposite ends thereof. The shell is adapted for radial expansion and contraction in response to variation of fluid pressure in the chamber to move the coupling members axially toward and away from each other between axially retracted and extended positions, respectively, and has a substantially constant surface area in all of its positions.

BRIEF DESCRIPTION OF THE DRAWING

FIG. 1 is a side elevational view of a fluid actuator embodying the present invention shown in an axially extended condition.

FIG. 2 is an end view of the actuator as it appears in FIG. 1.

FIG. 3 is similar to FIG. 1 but shows the actuator in an axially retracted condition.

FIG. 4 is an end view of the actuator as it appears in FIG. 3.

FIG. 5 is a somewhat enlarged fragmentary sectional view taken along the line 5—5 of FIG. 2.

FIG. 6 is a longitudinal sectional view of a device constructed in accordance with the invention for imparting linear displacement to a load.

FIG. 7 is generally similar to FIG. 6 but shows the device arranged to provide rotary output.

FIG. 8 is a longitudinal sectional view through a modified form of the device for operating a control button.

DETAILED DESCRIPTION OF THE PREFERRED EMBODIMENTS

Turning now to the drawings, and referring particularly to FIGS. 1-5 a fluid actuator embodying the present invention and indicated generally at 10 comprises a flexible hollow thin walled shell 12 which defines a fluid chamber 14, shown in FIG. 5. A pair of coupling members 16, 16 attached to opposite ends of the shell 12 extend outwardly therefrom in axially opposite directions for connecting the actuator to associated elements (not shown) which form part of another system, as will be hereinafter further discussed. The coupling members may take various forms, but in the illustrated actuator 10 the coupling members 16, 16 are substantially identical and each has a fluid passageway 18 therethrough which communicates with the chamber 14, as shown in FIG. 5. Either or both of the latter passageways may serve as a fluid inlet or a fluid outlet or exhaust passageway, as may be required in a given application of the device. The actuator 10 is movable between radially expanded and contracted positions respectively corresponding to axially retracted and extended positions of the coupling members 16, 16 in response to variation of fluid pressure in the chamber 14 and is shown in a radially contracted position in FIGS. 1 and 2 and in a radially expanded position in FIGS. 3 and 4.

The shell 12 may be made from any suitable flexible fluid impervious material, but preferably and as shown it is made from an elastomeric material such as neoprene suitably reinforced by a network of strands to resist elastic expansion. The shell includes a central body portion 20 which has a prolate spheroidal form when the actuator 10 is in an axially retracted position. Integral cylindrical tubular neck portions 22, 22 extend axially outwardly from opposite ends of the body portion 20. Each neck portion receives an associated coupling member 16 in fluidtight sealing engagement therein.

Referring now particularly to FIG. 5 a typical coupling member 16 is generally cylindrical and has a cylindrical bore or fluid passageway 18 extending coaxially therethrough. An integral radially outwardly extending annular flange 24 is formed at the inner end of the coupling member 16 and a plurality of circumaxially spaced binding posts 26, 26 extend radially outwardly from the member in axially spaced relation to the flange. The coupling member 16 also has a sealing surface 28 intermediate the flange 24 and the binding posts 26, 26 for fluid tight sealing engagement with the interior surface of the neck portion 22. An external thread 30 formed on the outer or free end of the coupling member 16 is provided for connecting the actuator to an internally threaded member (not shown) which may, for example, comprise a part of another system to which the actuator 10 is attached.

In accordance with the present invention, the surface area of the shell 12 remains substantially constant in all of the various positions of the actuator so that substantially all of the fluid energy input is converted to mechanical output and no substantial fluid energy is expended in stretching the shell material. It is for this reason that the various reinforcing strands are provided. A circumaxially spaced series of strands 32, 32 attached to the shell 12 extend in generally axial planes between the coupling members 16, 16 to provide connection therebetween. Each strand 32 may comprise one or more strands which connect a pair of opposing binding posts 26, 26. Preferably, and as shown, each strand 32 forms a part of a single continuous cord wound in serpentine fashion between the various binding posts 26, 26 and having each end portion thereof secured to an associated one of the binding posts. Each strand 32 is preferably attached to the shell 12 along its entire length intermediate the coupling members 16, 16 and may, if desired be bonded to the shell material. The strands 32, 32 cooperate with the shell to prevent axial elongation or stretching of the shell material, at least within the range of fluid pressure normally encountered in operation of the actuator 10.

Provision is also made to prevent radial expansion of the shell material within the aforesaid range of operating pressures and for this purpose a plurality of strands 34, 34 are attached to and generally circumaxially surround the shell 12 in its radially expanded position, as it appears in FIGS. 3 and 4. The latter strands may be closely wound or generally adjacent to each other, however, in the illustrated embodiment the strands 34, 34 are axially spaced apart and comprise convolutions of a single strand helically wound about the shell 12 in generally uniformly spaced convolutions between the coupling members 16, 16. For added strength, each neck portion 22 is bound to its associated coupling member 16 by a plurality of closely wound strands 36, 36 which surround the neck portion between the binding posts 26, 26 and the flange 24. The strands 36, 36 may, if desired, be formed by the continuation of the single elongated strand which comprises the strands 34, 34.

When the actuator 10 is in an axially extended position, FIGS. 1 and 2, the surface of the shell 12 is characterized by a circumaxially spaced series of ridges 38, 38 and valleys 40, 40. Each strand 32 is disposed within an associated valley 40 and extends in a direction generally parallel to the major axis of the actuator. An actuator may be constructed in accordance with the invention so that it has a natural tendency to return to either its axially retracted or its axially extended position when the pressure in the actuator chamber is substantially equal to atmospheric pressure. In the illustrated case, due to the resilient nature of the shell material and the arrangement of strands relative thereto, the actuator 10 is normally biased to its axially extended position when the fluid pressure in the chamber 14 is substantially equal to the pressure of the atmosphere acting upon the exterior surface of the shell. It should be understood, however, that an additional biasing means may be provided for urging the actuator 10 to its axially extended position and may, for example, comprise a biasing spring received within the chamber 14 or forming a part of an external system to which the actuator is connected.

The input pressure, output force and linear displacement characteristics of an actuator constructed in accordance with the present invention are determined by various parameters, as, for example the axial length/diameter ratio of the actuator shell. Thus, it will be apparent that the present fluid actuator may be provided in a wide range of operational characteristics. Actuators have been provided to operate at fractional input pressures, for example, pressures in the nature of 0.25 p.s.i. Such actuators find great utility in fluidic circuitry and may provide mechanical output in direct response to fluidic input signals. Further applications of the device are found in fluid-to-mechanical oscillator circuitry and pneumatic relay circuitry.

In FIGS. 6–8 applications of fluid actuators constructed in accordance with the invention are illustrated, however, it should be understood that the device is not limited or restricted to the applications shown.

Referring first to FIG. 6 a fluid actuator constructed in accordance with the present invention and indicated generally at 10a forms part of a reciprocating motor system. The actuator 10a is connected between a stationary part of the system and a movable load L and serves to move the load in one direction as the actuator moves from its axially extended of full-line position to its axially retracted or broken-line position in response to an increase in fluid pressure in the chamber 14a. A tension spring 42 provides biasing force for moving the load in the opposite direction when fluid is exhausted from the chamber 14a. It should be noted that the coupling member 16a provides both a fluid inlet and an exhaust outlet passageway from the chamber 14a. In FIG. 7 the fluid actuator 10a is shown connected in another system for rotating a drum 44 to impart rotary output to a shaft 46.

Referring now to FIG. 8, another actuator indicated generally at 10b and particularly adapted to provide a pushing force or thrust in response to fluid input pressure is shown in a simple system for operating an electrical control unit or switch or the like which is indicated at 48 and includes an operating member or button 50. The actuator 10b is similar in most respects to the actuator 10 previously described, but differs therefrom in the construction and arrangement of its coupling members. Specifically, the actuator 10b is provided with a coupling member 16b at one end thereof internally threaded to engage an external thread on the control switch 48. The actuator 10b includes another coupling member 16c which has a rodlike extension projecting axially through the chamber 14b toward a position of engagement with the button 50. The coupling member 16c has a fluid passageway 18C which communicates with the chamber 14b to provide for both fluid inlet and fluid exhaust. When the actuator 10b moves to its axially contracted or broken-line position under the influence of fluid pressure in the chamber 14b it will be evident that the coupling member 16c will exert a pushing force upon the operating button 50 to effect actuation thereof.

I claim:

1. A fluid actuator comprising an axially elongated flexible hollow thin-walled shell defining a fluid chamber and having a pair of axially opposed end openings, said shell being movable between axially extended and retracted positions in response to variation of fluid pressure in said chamber and having a surface of substantially constant area in all of said positions, said surface in said extended position having a fluted configuration characterized by a circumaxially spaced series of axially extending ridges and valleys, said surface in said retracted position comprising substantially a surface of revolution, a pair of coupling members, each of said coupling members being associated with one of said end openings in fluid tight sealing engagement with said shell, at least one of said coupling members having a fluid passageway therethrough communicating with said chamber, and a circumaxially spaced series of elongated strands connected to said coupling members and extending in an axial direction therebetween, each of said strands being disposed in an associated one of said valleys when said shell is in said extended position.

2. A fluid actuator as set forth in claim 1 wherein each of said strands is attached to said shell along the entire length thereof intermediate said coupling members.

3. A fluid actuator as set forth in claim 1 wherein each of said coupling members includes a circumaxially spaced series of generally radially outwardly extending binding posts and each of said strands is connected to an associated one of said posts.

4. A fluid actuator as set forth in claim 1 including connecting means associated with at least one of said coupling members.

5. A fluid actuator as set forth in claim 4 wherein said connecting means comprises a threaded portion of said one coupling member.

6. A fluid actuator as set forth in claim 1 wherein said strands comprise a continuous cord.

7. A fluid actuator as set forth in claim 1 wherein said shell is made from an elastomeric material.

8. A fluid actuator as set forth in claim 1 including a plurality of other strands attached to and generally circumaxially surrounding said shell in said retracted position.

9. A fluid actuator as set forth in claim 8 wherein said other strands are axially spaced apart and comprise convolutions of a single strand.

10. A fluid actuator as set forth in claim 1 wherein each of said coupling members is received in an associated one of said end openings.

11. A fluid actuator as set forth in claim 1 wherein said shell includes a pair of generally cylindrical axially extending neck portions, each of said neck portions defining an associated one of said end openings, and each of said coupling members is received in and associated with one of said neck portions and has an annular flange thereon disposed within said shell, said flange having a diameter larger than the inside diameter of said associated neck portion.

12. A fluid actuator as set forth in claim 7 wherein said strands are bonded to said elastomeric material.

13. A fluid actuator as set forth in claim 1 wherein said surface in said retracted position has a generally prolate spheroidal form.

14. A fluid actuator as set forth in claim 1 including a control unit connected to one of said coupling members and having an operating member disposed within said chamber, said other coupling member including a rodlike extension projecting axially into said chamber in alignment with said operating member for moving said operating member when said shell is moved from said axially extended to said axially retracted position.

15. A fluid actuator comprising an axially elongated hollow flexible thin-walled shell made from elastomeric material defining a fluid chamber and movable between axially extended and retracted positions in response to variation of fluid pressure in said chamber and having a surface of substantially constant area in all of said positions, said shell including a body portion of prolate spheroidal form in said retracted position and characterized by a circumaxially spaced series of ridges and valleys in said extended position, said shell having generally cylindrical tubular neck portions extending axially outwardly from opposite ends of said body portion, a pair of axially elongated generally cylindrical coupling members, each of said coupling members received in an associated one of said neck portions in fluidtight sealing engagement therewith, at least one of said coupling members having a fluid passageway therethrough communicating with said chamber, each of said coupling members having a circumaxially spaced series of generally radially outwardly extending binding posts thereon, a circumaxially spaced series of axially elongated substantially nonextensible strands, each of said strands being bonded to said shell along its entire length and connected to one of said binding posts associated with each of said coupling members and extending therebetween, each of said strands being disposed in an associated one of said valleys in said extended position, and another substantially inextensible strand bonded to said shell and forming a plurality of axially spaced convolutions generally circumferentially surrounding said body portion in said contracted condition.

* * * * *